United States Patent Office 3,209,619
Patented Oct. 5, 1965

3,209,619
POWER TRANSMISSION SYSTEM FOR A TRACTOR
Arthur Clifford Howard and John Arthur Howard, West Horndon, Essex, England, assignors to Rotary Hoes Limited, Essex, England
Filed June 24, 1963, Ser. No. 289,834
Claims priority, application Great Britain, June 29, 1962, 25,001/62
4 Claims. (Cl. 74—705)

The invention relates to a tractor having a power transmission system, for example a power-driven walk-type rotary cultivator, of the kind including a primary shaft adapted to be driven from an engine and adapted to provide a power output for a tool at a fixed ratio, a first lay-shaft at right-angles to the primary shaft and having a worm wheel driven from a worm on the primary shaft, a second lay-shaft parallel to and driven by a gear pair from the first lay-shaft, a selector shaft parallel to the two lay-shafts and interconnected with the road wheels of the tractor through gearing, and the selector shaft having a relatively non-rotatable gear cluster adapted to be slid for respective elements thereof optionally to engage a gear wheel fast with the first lay-shaft to drive the road wheels at a transportation speed, to engage a gear wheel journalled on the first lay-shaft and driven from a gear wheel fast with the second lay-shaft to drive the road wheels at a speed appropriate for the driven tool, or to engage a second gear wheel fast with the second lay-shaft for providing a reverse drive for the road wheels.

In the case of a power-driven walk-type rotary cultivator of the kind set forth the earth-working rotor will be driven at a constant speed from the engine, and the adjustment of the ratio between rotor speed and cultivator ground speed, for selecting the tilth to which the ground is to be worked, may only be effected by changing the ratio of road wheel speed to engine speed. It is often desirable for the ratio between the road wheel speed and the engine speed to be adjusted whilst the cultivator is working in the same field to account for variations in the consistency of the soil in different parts of the field, or to account for varying soil consistency due to changing weather conditions. The object of the invention is to enable a wide variety of ratios between road wheel speed and engine speed to be provided for easy selection without the expense of providing the cultivator with an intricate change-speed gear mechanism for the purpose, or to increase the number of ratios available when the cultivator is equipped with a change-speed gear.

According to the invention a tractor has a power transmission system of the kind set forth, which has corresponding one ends of the first and second lay-shafts extending through a casing for the transmission system into a compartment with a cover removable from outside the casing, and the gear pair by which the first lay-shaft drives the second lay-shaft is constituted by a pair of pick-off gear wheels which are rotatively fast with their respective lay-shafts but are axially-removable after said cover is removed, whereby the pair of pick-off gear wheels may be substituted or interchanged to alter the ratio between the speed of the tool and the speed of the road wheels.

According to one feature the removable cover of the pick-off gear wheel compartment may be provided with stub shafts which are aligned with the first and second lay-shafts and are adapted to support one or more pairs of pick-off gear wheels within the pick-off gear wheel compartment for substitution for those in use.

According to a further feature the selector shaft may be arranged to drive the road wheels through a differential gearing, and the drive between the selector shaft and the differential gearing is optionally through one of two unequal gear wheels driven by the selector shaft and the appropriate one of two corresponding unequal gear wheels adapted to drive the cage of the differential gearing.

According to another feature the road wheels may be driven by respective half shafts which are parallel with the axis of rotation of the differential gearing and are driven from the latter by respective bull pinions and bull wheels.

The invention is exemplified by the accompanying drawings, in which.

Figure 1:
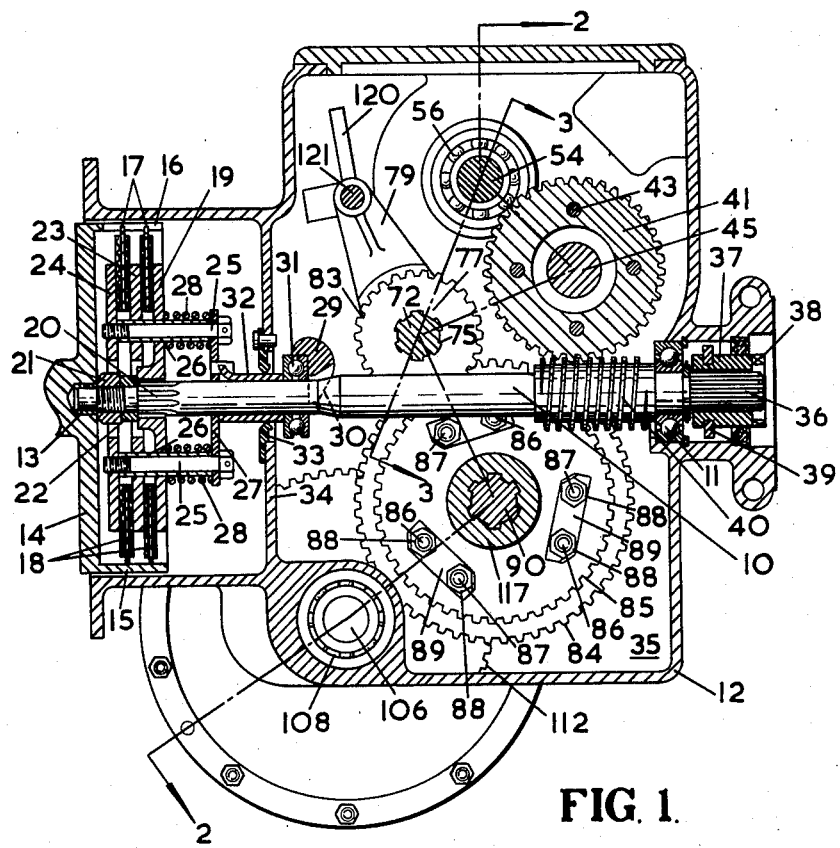
FIGURE 1 is a vertical section, taken on the line 1—1 of FIGURE 2, through a power transmission system, of the kind set forth, for a power-driven walk-type rotary cultivator.

Referring to FIGURE 1, the primary shaft 10 is supported by ball race 11 from casing 12 and by bush 13 from engine flywheel 14 which is provided with an annular flange 15 having a series of circumferentially-spaced axially-directed slots 16 for driving corresponding teeth 17 of two clutch discs 18. A pressure plate 19 is drivingly connected to the primary shaft 10 by splines 20 and is prevented from moxing axially to the left by nut 21 and spacing tube 22. The clutch discs 18 are intercalated between pressure plate 19 and further pressure plates 23 and 24 which latter are held drivingly fast with pressure plate 19 by bolts 25 and spacer tubes 26 which extend through axially-aligned holes in the pressure plates 19, 23 and 24. The bolts 25 also extend through a disc 27 journalled on primary shaft 10 and are screwed into pressure plate 24. A compression coil spring 28 is arranged coaxially about each spacer tube 26 and reacts between pressure plate 19 and the respective bolt 25 through disc 27 to cause the pressure plates 19, 23 and 24 to engage the clutch discs 18 for effecting a drive between engine flywheel 14 and primary shaft 10. This drive can be disconnected by rotating a cross shaft 29 to cause levers 30 to urge disc 27 to the left through thrust race 31 and axially-slidable sleeve 32. An oil seal 33 is supported by web 34 of casing 12 and surrounds sleeve 32 to prevent leakage of oil from the gearbox 35 to the clutch discs 18. The tail end of the primary shaft 10 has splines 36 for driving an axially-slidable sleeve 37 which is provided with axially-directed dogs 38 and can be moved by a selector fork 39 to the right to engage corresponding dogs for driving the rotor of the cultivator at a fixed ratio. The force exerted by springs 28 causing engagement of the clutch 18, 19, 23 and 24 is arranged to be such that the said clutch will slip when overloaded by, for example, the rotor of the cultivator striking an obstacle.

Primary shaft 10 is provided with a worm 40 which meshes a worm wheel 41. As will be seen from FIGURE 2, the worm wheel 41, together with a gear wheel 42, is secured by bolts 43 to a flange 44 welded to the first lay-shaft 45 which is supported from the casing 12 by bearings 46, 47. A hub 48, having gear wheels 49, 50 formed on it, is journalled from the first lay-shaft 45 by needle roller bearings 51 and is restrained against axial movement by washers 52 and 53.

The second lay-shaft 54 is supported by bearings 55, 56 from the casing 12 to be parallel with the first lay-shaft 45, and is formed with splines 57 adjacent bearing 55 for driving two gear wheels 58, 59 of which the latter is in permanent mesh with gear wheel 50 of the first lay-shaft.

In accordance with the principal feature of the invention the lay-shafts 45 and 54 have respective identically splined portions 60, 61 which extend respectively through bearings 47 and 56 into a compartment 62 having a readily removable cover 63 provided with a sealing ring 64, and a pair of meshing pick-off gear wheels 65, 66 are respectively supported from splines 60, 61 for transmitting drive from the first lay-shaft 45 to the second lay-shaft 54. When the cover 63 is removed the pick-off gear wheels 65, 66 can conveniently be substituted to alter the ratio between the lay-shafts 45 and 54. The cover 63 is provided with stub shafts 67, 68 that are aligned with the lay-shafts 45, 54 respectively and support a pair of substitute pick-off gear wheels 69, 70 which additionally locate the operative pick-off gear wheels 65, 66 axially of their respective splined portions 60, 61. A collar 71 is arranged intermediate each operative pick-off gear wheel 65, 66 and its respective bearing 47, 56 to ensure that the respective splined portions 60, 61 do not extend axially from the operative pick-off gear wheels 65, 66 towards the substitute pick-off gear wheels 69, 70.

The pick-off gear wheels 65 and 66 are of identical size so that the first lay-shaft 45 drives the second lay-shaft 54 at unit ratio, but pick-off gear wheels 69 and 70 are of different sizes thus enabling the second lay-shaft 54 to be driven at two alternative ratios according to which of the gear wheels 69, 70 is assembled on the first lay-shaft 45, and which on the second lay-shaft 54. Further pairs of pick-off gear wheels enable the ratio of the drive from the first lay-shaft to the second lay-shaft to be varied still further, two alternative ratios being provided by each pair of pick-off gear wheels.

Figure 3:
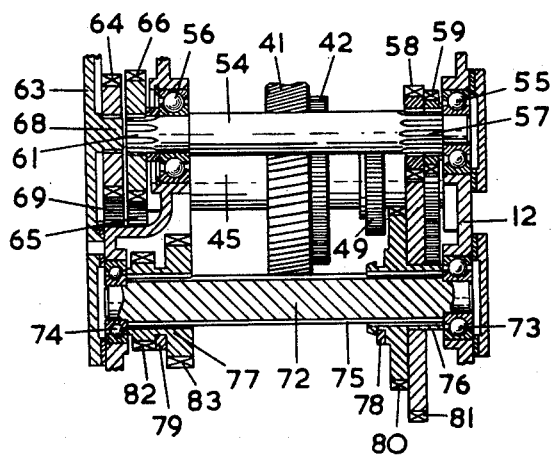
FIGURE 3 is a section taken on the line 3—3 of FIGURE 1, also omitting the primary shaft and showing a different gear ratio engaged.

Selector shaft 72 is supported by bearings 73 and 74 from the casing 12 and is provided intermediate its bearings 73, 74 with splines 75 along which two internally-splined hubs 76, 77 may be slid by respective selectors 78 and 79. Hub 76 is rotatively fast with two unequal gear wheels 80, 81 and can be slid axially by its selector 78 from the position shown, in which the selector shaft 72 is driven directly from worm wheel 41 through gear wheels 42 and 80 to give a forward drive at one ratio, to a position in which gear wheel 81 meshes gear wheel 49 and the selector shaft 72 is driven indirectly from worm wheel 41 through pick-off gear wheels 65 and 66, second lay-shaft 54, gear pair 59 and 50, hub 48, and gear pair 49 and 81 to give a forward drive at another ratio. As shown in FIGURE 3, hub 76 can be slid to a further position in which gear wheel 81 meshes gear wheel 58 of the second lay-shaft 54 and the selector shaft 72 is driven indirectly from worm wheel 41 through pick-off gear wheels 65 and 66, second lay-shaft 54 and gear pair 58 and 81 to give a reverse drive.

Figure 2:
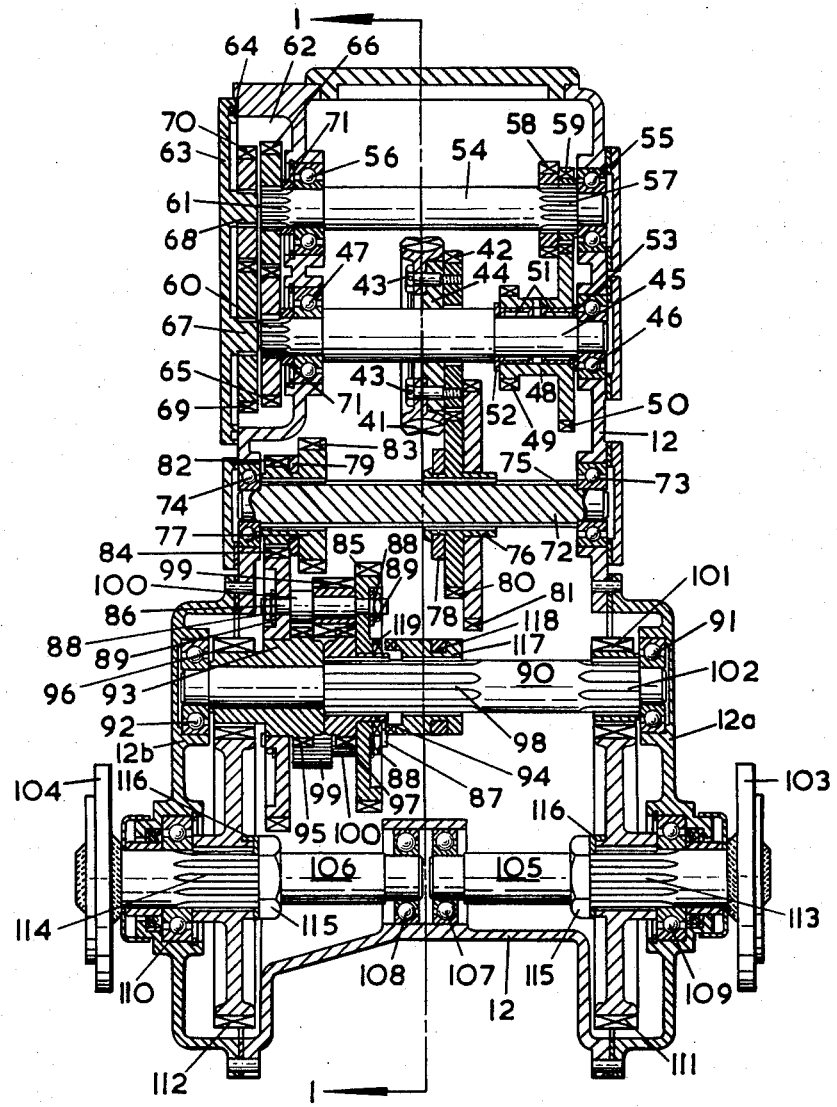
FIGURE 2 is a section taken on the line 2—2 of FIGURE 1 but omitting the primary shaft.

Hub 77 is rotatively fast with two unequal gear wheels 82, 83 and can be slid axially by its selector 79 between the position shown in FIGURE 2 in which gear wheel 82 meshes with a gear wheel 84, and a position in which gear wheel 83 meshes with a gear wheel 85. The gear wheels 84 and 85 are interconnected by three pairs of alternately-arranged shafts 86, 87, nuts 88 and locking tabs 89, to form the cage of a differential gearing which is mounted on a shaft 90 supported from casing 12 by bearings 91, 92 in check plates 12a, 12b.

The gear wheels 84, 85 forming the cage are journalled respectively on hubs 93, 94 of which hub 93 is journalled on shaft 90 and is formed integral with sun wheel 95 and bull pinion 96, and hub 94 is formed integral with sun wheel 97 and is drivingly connected to shaft 90 by splines 98. Six planet wheels 99 are journalled on the shafts 86, 87 which are formed with annular flanges 100 for spacing the planet wheels 99 relatively to the cage 84, 85 so that alternate planet wheels are carried by shafts 86 and mesh with sun wheel 97 only and that the intermediate planet wheels are carried by shafts 87 and mesh with sun wheel 95 only.

As previously described, the differential cage 84, 85 is driven from selector shaft 72 either through gear pair 82, 84 or through gear pair 83, 85 and the action of the planet wheels 99 on the sun wheels 95, 97 allows bull pinion 96 to be driven differentially to shaft 90 which drives a second bull pinion 101, of the same dimensions as bull pinion 96, through splines 102. A pair of hubs 103, 104 for the driving wheels are welded to respective half shafts 105, 106 which are supported at their inner ends by respective bearings 107, 108 from the casings 12, and at their outer ends by respective bearings 109, 110 in check plates 12a and 12b. The hubs 103, 104 are driven from bull pinions 101 and 96 respectively through bull wheels 111, 112 which have respective splined connections 113, 114 with half shafts 105 and 106 and are located axially of the latter by nuts 115 and lock washers 116.

In some circumstances, particularly when very slippery ground is being cultivated, it is desirable to inhibit the differential action between the hubs 103 and 104 and, for this purpose a dog clutch member 117 is axially movable by a selector 118 along splines 98 of shaft 90 to engage axially-directed dogs 119 on gear wheeel 85 for locking the differential gearing 95, 97 and 99.

As will be seen in FIGURE 1, the selector fork 79 is slidable by control means 120 along a shaft 121 for moving the hub 77 along the selector shaft 72. The selector forks 78 and 118 are supported in a similar manner.

For transportation along, say, a road from one site to another, the drive to the rotor is disconnected by operating dog clutch 38 to the left and gear cluster 80, 81 is operated to the position shown in FIGURE 2 in which selector shaft 72 is driven at a main transport ratio directly from the first lay-shaft 45 through gear wheels 42 and 80. The gear pairs 82 and 84, and 83 and 85, however, make two alternative transport ratios available. When the cultivator has arrived at the site and cultivation is to begin, the drive to the rotor is connected by operating dog 38 to the right and gear cluster 80, 81 is slid by selector 78 for gear wheel 81 to mesh gear wheel 49 whereby the drive to selector shaft 72 is through the selected pair of pick-off gear wheels. It will be seen that by providing alternative pairs of pick-off gear wheels which can easily be slipped on the lay-shafts after removal of the cover 63, and by operating gear cluster 82, 83 to its alternative position, a wide range of cultivation ratios is provided. If it is desired to drive the cultivator in reverse, either whilst being transported or whilst cultivating, the gear cluster 80, 81 is operated to the position shown in FIGURE 3 and a wide range of ratios can be selected by changing the pick-off gear wheels and by operating gear cluster 82, 83.

What we claim as our invention and desire to secure by Letters Patent of the United States is:

1. A power transmission system for a tractor comprising a primary shaft adapted to be driven from an engine of the tractor, a casing defining two compartments, a first bearing means adapted to support said primary shaft from said casing within one of said compartments, driving means rotatively fast with said primary shaft and adapted to drive a tool, a first lay-shaft, a second bearing means adapted to support said first lay-shaft from said casing within said one compartment and at right-angles to said primary shaft, a worm adapted to be driven by said primary shaft, a worm wheel adapted to drive said first lay-shaft, said worm arranged to drive said worm wheel, a second lay-shaft, a third bearing means adapted to support said second lay-shaft from said casing within said one compartment and parallel to and spaced from said first lay-shaft, a selector shaft, a fourth bearing means adapted to support said selector shaft from said casing within said one compartment and parallel to and spaced from both said lay-shafts, a pair of half shafts for driving road wheels of said tractor, a fifth bearing means adapted to support said half shafts from said casing, said half shafts extending from outside said casing through said fifth bearing means into said one compartment, gearing arranged within said one compartment and adapted to drive said half shafts from said selector shaft, a gear cluster coaxial with said selector shaft, means holding said gear cluster rotatively fast with said selector shaft, a selector adapted to move said gear cluster axially of said selector shaft, a first gear wheel coaxially fast with said first lay-shaft, said gear cluster including a gear wheel adapted to mesh with said first gear wheel for said first lay-shaft to drive said half shafts at a speed suitable for transportation, a second gear wheel coaxially fast with said second lay-shaft, a third gear wheel coaxially fast with said second lay-shaft, said gear cluster including a gear wheel adapted to mesh with said second gear wheel for said second lay-shaft to drive said half shafts in reverse, a fourth gear wheel coaxial with said first lay-shaft, a fifth gear wheel coaxial with said first lay-shaft, means for driving said fifth gear wheel from said fourth gear wheel, a sixth bearing means adapted to support said fourth gear wheel and said fifth gear wheel from said first lay-shaft, means locating said fourth gear wheel axially of said first lay-shaft to mesh with said third gear wheel, said gear cluster including a gear wheel adapted to mesh with said fifth gear wheel for said second lay-shaft to drive said half shafts at a speed which is lower than the transportation speed but is appropriate for the said tool, a portion of said first lay-shaft extending through said second bearing means into the other of said compartments, a portion of said second lay-shaft extending through said third bearing means into said other compartment, said other compartment having an outwardly presented opening opposite to said second bearing means and said third bearing means, a cover for said opening defining a wall of said other compartment, said cover providing access to said other compartment, a sixth gear wheel coaxial with said first lay-shaft and arranged within said other compartment, a drive connection between said sixth gear wheel and said portion of said first lay-shaft, a seventh gear wheel coaxial with said second lay-shaft and arranged within said other compartment, a drive connection between said portion of said second lay-shaft and said seventh gear wheel, said sixth gear wheel meshing with said seventh gear wheel for said first lay-shaft to drive said second lay-shaft, said sixth gear wheel axially-removable from said first lay-shaft after said cover has been removed, and said seventh gear wheel axially-removable from said second lay-shaft after said cover has been removed, whereby said sixth gear wheel and said seventh gear wheel may be substituted to alter the ratio between the speed at which said tool is driven and the speed at which said half shafts are driven.

2. A power transmission system for a tractor comprising a primary shaft adapted to be driven from an engine of the tractor, a casing defining two compartments, a first bearing means adapted to support said primary shaft from said casing within one of said compartments, driving means rotatively fast with said primary shaft and adapted to drive a tool, a first lay-shaft, a second bearing means adapted to support said first lay-shaft from said casing within said one compartment and at right-angles to said primary shaft, a worm adapted to be driven by said primary shaft, a worm wheel adapted to drive said first lay-shaft, said worm arranged to drive said worm wheel, a second lay-shaft, a third bearing means adapted to support said second lay-shaft from said casing within said one compartment and parallel to and spaced from said first lay-shaft, a selector shaft, a fourth bearing means adapted to support said selector shaft from said casing within said one compartment and parallel to and spaced from both said lay-shafts, a pair of half shafts for driving road wheels of said tractor, a fifth bearing means adapted to support said half shafts from said casing, said half shafts extending from outside said casing through said fifth bearing means into said one compartment, gearing arranged within said one compartment and adapted to drive said half shafts from said selector shaft, a gear cluster coaxial with said selector shaft, means holding said gear cluster rotatively fast with said selector shaft, a selector adapted to move said gear cluster axially of said selector shaft, a first gear wheel coaxially fast with said first lay-shaft, said gear cluster including a gear wheel adapted to mesh with said first gear wheel for said first lay-shaft to drive said half shafts at a speed suitable for transportation, a second gear wheel coaxially fast with said second lay-shaft, a third gear wheel coaxially fast with said second lay-shaft, said gear cluster including a gear wheel adapted to mesh with said second gear wheel for said second lay-shaft to drive said half shafts in reverse, a fourth gear wheel coaxial with said first lay-shaft, a fifth gear wheel coaxial with said first lay-shaft, means for driving said fifth gear wheel from said fourth gear wheel, a sixth bearing means adapted to support said fourth gear wheel and said fifth gear wheel from said first lay-shaft, means locating said fourth gear wheel axially of said first lay-shaft to mesh with said third gear wheel, said gear cluster including a gear wheel adapted to mesh with said fifth gear wheel for said second lay-shaft to drive said half shafts at a speed which is lower than the transportation speed but is appropriate for the said tool, a portion of said first lay-shaft extending through said second bearing means into the other of said compartments, a portion of said second lay-shaft extending through said third bearing means into said other compartment, said other compartment having an outwardly presented opening opposite to said second bearing means and said third bearing means, a cover for said opening defining a wall of said other compartment, said cover providing access to said other compartment, a sixth gear wheel coaxial with said first lay-shaft and arranged within said other compartment, a drive connection between said sixth gear wheel and said portion of said first lay-shaft, a seventh gear wheel coaxial with said second lay-shaft and arranged within said other compartment, a drive connection between said portion of said second lay-shaft and said seventh gear wheel, said sixth gear wheel meshing with said seventh gear wheel for said first lay-shaft to drive said second lay-shaft, said sixth gear wheel axially-removable from said first lay-shaft after said cover has been removed, said seventh gear wheel axially-removable from said second lay-shaft after said cover has been removed, a pair of stub shafts fast with said cover, one of said stub shafts coaxial with said first lay-shaft when said cover is in place, the other of said stub shafts coaxial with said second lay-shaft when said cover is in place, an eighth gear wheel adapted to replace said sixth gear wheel, a ninth gear wheel adapted to replace said seventh gear wheel, and said eighth gear wheel and said ninth gear wheel removably supported by said pair of stub shafts, whereby said sixth gear wheel and said seventh gear wheel may be substituted by said eighth gear wheel and said ninth gear wheel to alter the ratio between the speed at which said tool is driven and the speed at which said half shafts are driven.

3. A power transmission system for a tractor comprising a primary shaft adapted to be driven from an engine of the tractor, a casing defining two compartments, a first bearing means adapted to support said primary shaft from said casing within one of said compartments, driving means rotatively fast with said primary shaft and adapted to drive a tool, a first lay-shaft, a second bearing means adapted to support said first lay-shaft from said casing within said one compartment and at right-angles to said primary shaft, a worm adapted to be driven by said primary shaft, a worm wheel adapted to drive said first lay-shaft, said worm arranged to drive said worm wheel, a second lay-shaft, a third bearing means adapted to support said second lay-shaft from said casing within said one compartment and parallel to and spaced from said first lay-shaft, a selector shaft, a fourth bearing means adapted to support said selector shaft from said casing within said one compartment and parallel to and spaced from both said lay-shafts, a pair of half shafts for driving road wheels of said tractor, a fifth bearing means adapted to support said half shafts from said casing, said half shafts extending from outside said casing through said fifth bearing means into said one compartment, a differential gearing arranged within said one compartment and adapted to drive said half shafts, a hub coaxial with said selector shaft, means holding said hub rotatively fast with said selector shaft, a first selector adapted to move said hub axially of said selector shaft, two unequal gear wheels drivingly connected to said hub, two unequal gear wheels drivingly connected to said differential gearing, one of said unequal gear wheels connected to said hub meshing with one of said unequal gear wheels connected to said differential gearing for driving said differential gearing from said selector shaft at one ratio, said one ratio disengaged when said first selector moves said hub to mesh the other said unequal gear wheel connected to said hub with the other said unequal gear wheel connected to said differential gearing for driving said differential gearing from said selector shaft at another ratio, a gear cluster coaxial with said selector shaft, means holding said gear cluster rotatively fast with said selector shaft, a second selector adapted to move said gear cluster axially of said selector shaft, a first gear wheel coaxially fast with said first lay-shaft, said gear cluster including a gear wheel adapted to mesh with said first gear wheel for said first lay-shaft to drive said half shafts at a speed suitable for transportation, a second gear wheel coaxially fast with said second lay-shaft, a third gear wheel coaxially fast with said second lay-shaft, said gear cluster including a gear wheel adapted to mesh with said second gear wheel for said second lay-shaft to drive said half shafts in reverse, a fourth gear wheel coaxial with said first lay-shaft, a fifth gear wheel coaxial with said first lay-shaft, means for driving said fifth gear wheel from said fourth gear wheel, a sixth bearing means adapted to support said fourth gear wheel and said fifth gear wheel from said first lay-shaft, means locating said fourth gear wheel axially of said first lay-shaft to mesh with said third gear wheel, said gear cluster including a gear wheel adapted to mesh with said fifth gear wheel for said second lay-shaft to drive said half shafts at a speed which is lower than the transportation speed but is appropriate for the said tool, a portion of said first lay-shaft extending through said second bearing means into the other of said compartments, a portion of said second lay-shaft extending through said third bearing means into said other compartment, said other compartment having outwardly presented opening opposite to said second bearing means and said third bearing means, a cover for said opening defining a wall of said other compartment, said cover providing access to said other compartment, a sixth gear wheel coaxial with said first lay-shaft and arranged within said other compartment, a drive connection between said sixth gear wheel and said portion of said first lay-shaft, a seventh gear wheel coaxial with said second lay-shaft and arranged within said other compartment, a drive connection between said portion of said second lay-shaft and said seventh gear wheel, said sixth gear wheel meshing with said seventh gear wheel for said first lay-shaft to drive said second lay-shaft, said sixth gear wheel axially-removable from said first lay-shaft after said cover has been removed, and said seventh gear wheel axially-removable from said second lay-shaft after said cover has been removed, whereby said sixth gear wheel and said seventh gear wheel may be substituted to alter the ratio between the speed at which said tool is driven and the speed at which said half shafts are driven.

4. A power transmission system for a tractor as in claim 3 and comprising a bull wheel drivingly fast with each said half shaft within the said one compartment, a pair of bull pinions adapted to drive said bull wheels, and a differential gearing arranged within said one compartment and adapted to drive said bull pinions.

References Cited by the Examiner
UNITED STATES PATENTS

| | | | |
|---|---|---|---|
| 2,585,218 | 2/52 | Borngraeber | 74—325 |
| 2,975,656 | 3/61 | Haverlender | 74—15.63 X |
| 3,031,893 | 5/62 | Doleschalex | 74—15.6 |

DON A. WAITE, *Primary Examiner.*